(12) United States Patent
Spangler

(10) Patent No.: US 8,101,071 B2
(45) Date of Patent: Jan. 24, 2012

(54) OIL REMOVAL RECLAMATION CLARIFIER SYSTEM AND PROCESS FOR USE

(75) Inventor: John M. Spangler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 512 days.

(21) Appl. No.: 12/205,211

(22) Filed: Sep. 5, 2008

(65) Prior Publication Data

US 2009/0001022 A1 Jan. 1, 2009

Related U.S. Application Data

(63) Continuation-in-part of application No. 11/823,919, filed on Jun. 29, 2007, now Pat. No. 7,799,218.

(51) Int. Cl.
*B01D 17/032* (2006.01)

(52) U.S. Cl. .................. 210/195.1; 210/195.3; 210/197; 210/202; 210/206; 210/207; 210/519

(58) Field of Classification Search ................ 210/195.1
See application file for complete search history.

(56) References Cited

U.S. PATENT DOCUMENTS

| | | | | |
|---|---|---|---|---|
| 1,480,379 A | * | 1/1924 | Elliott et al. ................ | 210/537 |
| 1,957,303 A | * | 5/1934 | Tietig ........................... | 210/218 |
| 4,151,078 A | * | 4/1979 | Calvin ......................... | 210/671 |
| 5,300,222 A | * | 4/1994 | Broussard, Sr. .............. | 210/202 |
| 5,605,636 A | * | 2/1997 | Wyness ......................... | 210/801 |
| 5,851,386 A | * | 12/1998 | Paul .............................. | 210/183 |
| 6,358,415 B1 | * | 3/2002 | Leung .......................... | 210/205 |
| 6,881,349 B2 | * | 4/2005 | Mueller ........................ | 210/708 |
| 7,258,800 B1 | * | 8/2007 | Herbst .......................... | 210/703 |
| 7,799,218 B2 | * | 9/2010 | Spangler ..................... | 210/167.3 |

OTHER PUBLICATIONS

U.S. Appl. No. 11/823,919, filed Jun. 29, 2007, entitled "A Paint Reclamation Clarifier System and Process for Use," pp. 1-14.

\* cited by examiner

*Primary Examiner* — Peter A Hruskoci

(74) *Attorney, Agent, or Firm* — Janda M. Carter

(57) ABSTRACT

One aspect of the present disclosure includes an oil removal reclamation clarifier system in communication with a body of oil laden wastewater fluid and a conduit for transporting the fluid to the reclamation clarifier system. The reclamation clarifier system includes an oil removal mixing containment device having an influent port, an agent inlet, a sludge collection section in a lower portion of the device for collecting the dispersed liquid, a sludge outlet, and, at least one decant valves located on or near an upper portion of a sidewall of the oil removal clarifier device for permitting unsettled material to exit from the clarifier.

9 Claims, 2 Drawing Sheets

OIL REMOVAL RECLAMATION CLARIFIER SYSTEM AND PROCESS FOR USE

This application is a continuation-in-part of U.S. patent application Ser. No. 11/823,919, entitled "A PAINT RECLAMATION CLARIFIER SYSTEM AND PROCESS FOR USE", filed Jun. 29, 2007, now U.S. Pat. No. 7,799,218.

TECHNICAL FIELD

This disclosure relates generally to a system and process for wastewater treatment, and more particularly to a containment device for oil removal using a sorptive agent and the process for use.

BACKGROUND

Oil spills, which are the release of a liquid petroleum hydrocarbon into the environment, occur due to various reasons. The oil may be a variety of materials, including crude oil, refined petroleum products or by-products, oily refuse, or oil mixed in waste. The combination of oil and water is often termed wastewater.

Strict corporate and governmental policies dictate that constraints be placed on the quality of water discharged in the environment, including a strict limitation of residual oil in water prior to disposal. For water injection used in secondary oil recovery, is also a requirement for high water quality in order to maintain reservoir integrity. Treating oil-laden water efficiently is critical for meeting production targets as well as regulatory oil-in-water specifications.

There have been numerous attempts to find efficient, economical methods for removing oil from water, especially when the oil appears to be environmentally or ecologically detrimental. Aside from the possible danger to animal like, plant life, or marine life, oil in water ways can be a fire hazard, can present chemical problems to segments of the public or industry who may use the water in various processes, and can be wasteful and a general nuisance. In some cases, exotic or expensive oils need to be saved from loss. Among the many methods that have been taught and proposed for removing oil from water include the use of various sorption agents or sorptives. In some cases, it is possible to recover a fair amount of the oil from the sorptive by draining, squeezing, or washing with a solvent. Even when some of the oil is recovered from the sorptive, the sorptive along with residual oil is generally intended to be discarded or destroyed. There exists a need for a device that can use the sorptive without discarding or destruction.

In treatment, the oil in wastewater tends to coagulate and adhere to surrounding surfaces, particularly in sump and drain areas, and must constantly be removed from the sump to prevent clogging of the sump drain and recirculating system. In order to assist in the removal of the oil from the wastewater and to provide efficient operations, absorbing or sorptive agents have been employed in wastewater. These agents may include, but are not limited to various fumed silicas. Encapsulating the oil eliminates or minimizes the adverse properties, thereby minimizing the aforementioned clogging.

The use of hydrophobic fumed silica (HFS) as an oil sorption agent (sorptive) is known. This technology brings the hydrophobic fumed silica into contact with a mixture of oil and water. The oil becomes sorbed on the silica and the encapsulated oil is removed from the water.

For example, one approach to treating oil-laden wastewater is described in U.S. Pat. No. 4,151,078 issued Apr. 24, 1979 to Calvin. This process discusses using hydrophobic silicas, containing sorbed HF values to remove oil from water. While the use of HFS is known, due to the nature of the small, lightweight HFS particles, it is not a feasible material for many oil treatment facilities, nor the open waters of a vessel or petroleum-well based oil spill. Additionally, there remains a need for a portable collection containment system that may significantly reduce the amount of water required in a wastewater treatment system, as well as reduce the loss of fumed silica.

The presently disclosed systems and methods are directed to overcoming one or more of the problems set forth above.

SUMMARY OF THE INVENTION

One aspect of the present disclosure includes an oil removal reclamation clarifier system in communication with a body of oil laden wastewater fluid and a conduit for transporting the fluid to the reclamation clarifier system. The reclamation clarifier system includes an oil removal mixing containment device having an influent port, a sorptive agent inlet, a phase separation section in a portion of the device, an outlet, and at least one decant valve located along a sidewall of the oil removal clarifier device for removing material from the clarifier.

In another aspect of the present disclosure, a method of reclamation and clarification of oil-laden wastewater from a carrier fluid is disclosed. The method includes the steps of adding a sorptive agent through an inlet into an oil removal mixing containment device of an oil removal reclamation clarifier system, introducing oil-laden wastewater into the mixing containment device of an oil removal reclamation clarifier system, placing the fluid containing oil-laden wastewater into rigorous contact with the sorptive agent within the oil removal mixing containment device, directing the non-encapsulated fluid from a phase separation section of the oil removal reclamation clarifier through an outlet, and directing unsettled encapsulated oil material out of the containment device.

DETAILED DESCRIPTION

Figure 1:
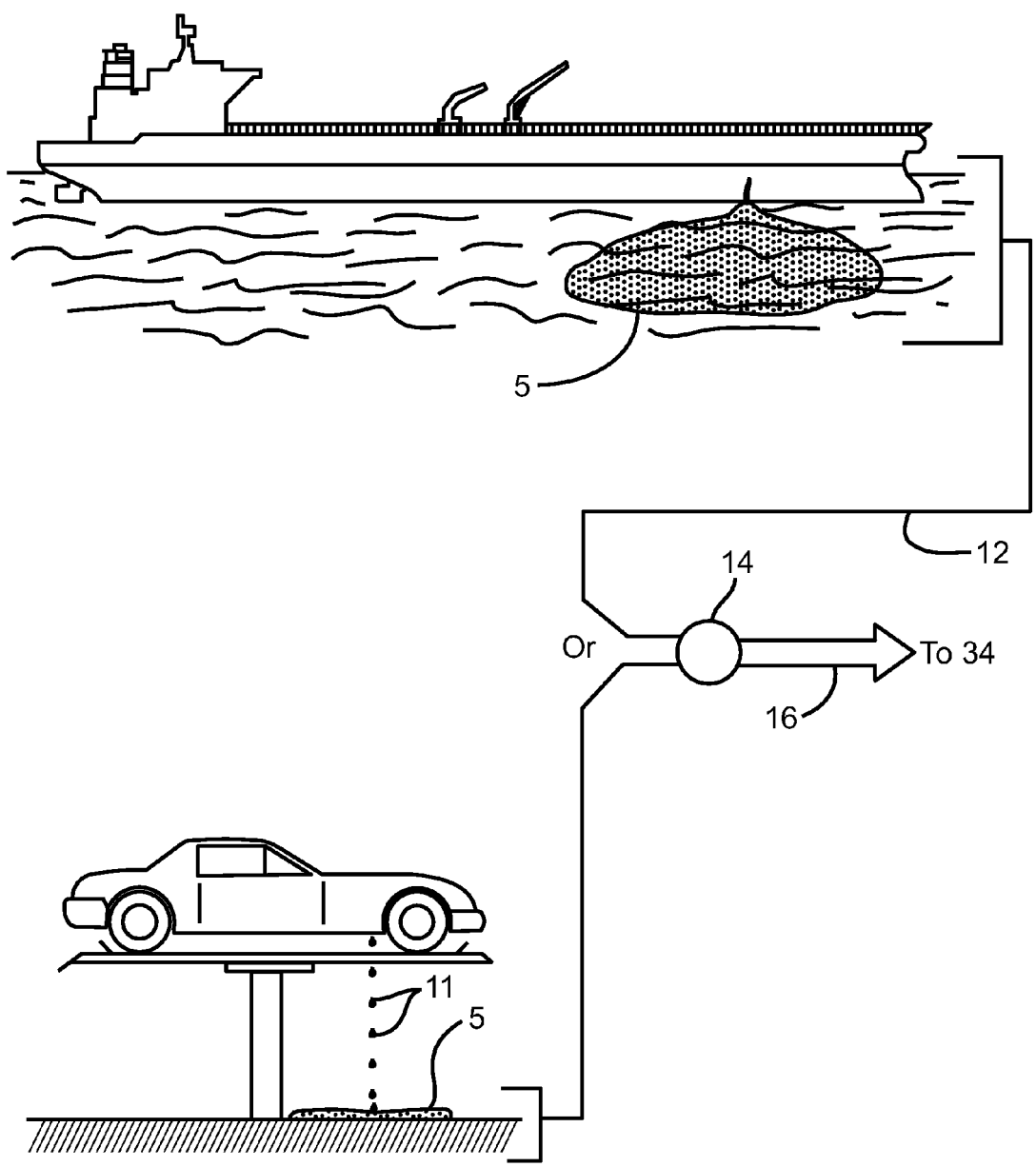
FIG. 1 is an illustration of various influent sources in accordance with the present disclosure.

A representative influent source or oil-laden wastewater spill 5 suitable for carrying out an embodiment of the present disclosure is shown in FIG. 1. The oil-laden wastewater 5 may be a result of industrial, commercial or environmental factors where a certain amount of oil has been introduced to a body or area of water, or where wastewater is used where oil is present, and the combined fluid needs to be treated and removed. The collection of the oil-laden wastewater 5 may be controlled automatically, by robot, or by human operator. For purposes of the present innovation, the amount of oil in the fluid may be minimal (less than one-half of a percent by volume, for example) or substantially more.

These wastewater fluids 5 to be separated may be supplied through an inlet line 12 to a pump 14. The pump 14 may be of an air-operated diaphragm type, which is commercially available. This type of pump minimizes further mixing of homogenizing of the liquids that are to be separated. From the pump 14, the wastewater fluids 5 may flow through an outlet line 16 and a flow control valve (not shown) to supply pipe or exit conduit 34. As would be understood, any appropriate transport system and method may be employed.

Figure 2:
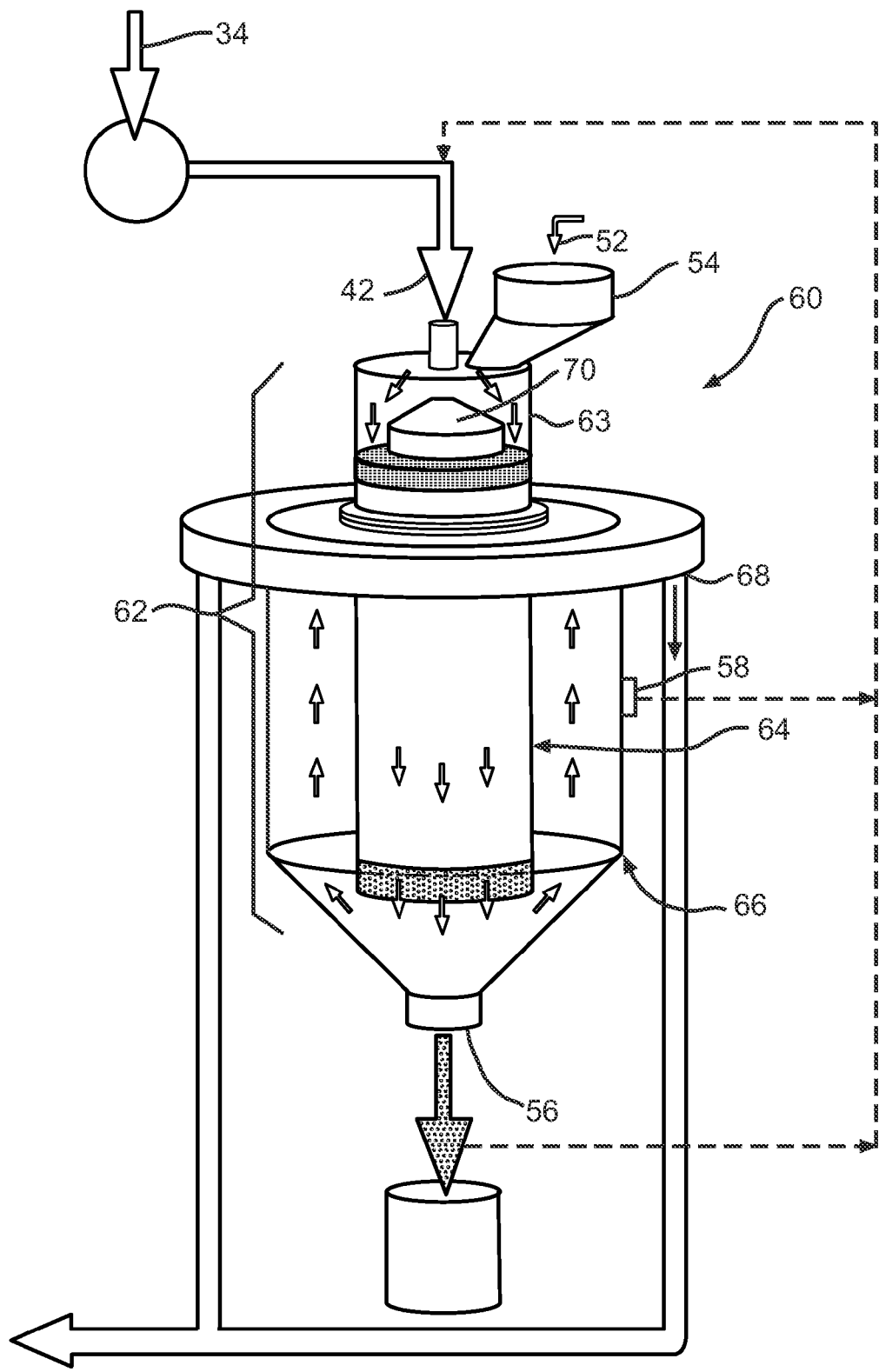
FIG. 2 is a schematic and diagrammatic representation of an exemplary embodiment of a reclamation clarifier system in accordance with the present disclosure.

A batch or continuous flow of powderous, gelatinous, or liquid sorptive agent (not shown) is added to the oil removal mixing containment device 62 at the sorptive agent inlet 52 of the reclamation mixing containment collection system of oil removal system of FIG. 2. The sorptive agent inlet 52 may be shaped as a hopper with a volumous area for conveniently allowing a user to pre-fill the sorptive agent inlet 52 with sorptive agent. The sorptive agent inlet 52 may include a cover 54 which may be hingedly connected to the top of the sorptive agent inlet 52.

Oil laden wastewater 5 may be introduced to the reclamation mixing containment collection system at influent port 42 optionally via an exit conduit 34. The influent port 42 may have a lid (not shown). The oil removal system 10 also includes an agent inlet 52, at least one decant valve 58 located on or near a sidewall of the oil removal system 10, an outlet 56, and a mixing containment device 62. The at least one decant valve 58 may be aligned vertically at varying height levels along the side wall of the clarifier system 60 providing initial horizontally directed flow, or may be near yet outboard of the sidewall, with vertically directed flow, as would be understood by one skilled in the art.

The oil removal mixing containment device 62 may include an upper section 63 and a lower section 64. The oil removal system 10 may be cylindrical and generally shaped for gravitational fluid flow. The upper section 63 is closed at its upper end (except for the inlet areas). The lower section 66 of the oil removal system 10 may have a larger overall volume than the upper section 63, and the oil removal mixing containment device 62 may be partially contained within the lower section 66 of the oil removal system 10. The upper end of the lower section 66 is closed from the open atmosphere and operates to direct the effluent towards a dispersion device or weir 68. Decant valves 58 may operate to allow directed material flow.

The weir 68 (along with a baffle system) located outside of the oil removal mixing containment device 62 provides the opportunity to re-introduce the non-encapsulated process fluid material that may have settled, back into the mixing containment device 62 via a pump system, or optionally may be siphoned off with a pumpless return. Additionally, the process material may be directed to a dewatering device (not shown), described further below.

Optionally, the oil-laden wastewater 5 may be pumped into the mixing containment device 62. However, it may be possible to send the wastewater through the mixing containment device 62 either by gravity (this depends on the location of the clarifier) or by siphons. The system may optionally have two pumps if gravity or siphoning is not feasible. Further there may be a series of the oil removal systems 60 in concert and communication for ultra high volume oil removal operations, such as would be contemplated on a carrier vessel on a large body of water.

Within the upper section 63 of the mixing containment device 62, wastewater at the influent port 42 and the sorptive agent from the agent inlet 52 are forced together through strong circulation currents. The reaction following the contact of the wastewater fluid 5 to the sorptive agent is immediate. This interaction within the mixing containment device 62 is a major factor. When the oil-laden wastewater 5 is high velocity pumped or introduced by other means into the mixing containment device 62, onto the sorptive agent, the oil droplets 11 come in forced contact with the sorptive agent. Since the sorptive agent is contained (with a closed and sealed top) 54, a strong washing effect occurs when the wastewater 5 is directed through the layer of sorptive agent. As a result, the oil droplets 11 in the wastewater 5 become coated with sorptive agent, within the mixing containment device 62. With continuous flow of wastewater 5 turbulently mixing through the sorptive agent in the mixing containment device 62, the oil droplets 11 are continuously contacting the layer of sorptive agent within the mixing containment device 62. As is understood by those skilled in the art, the oil droplets are encapsulated and the encapsulated oil rises to the top.

A mixing dispersion device 70 may optionally be located at the upper end of the upper section 63 of the mixing containment device 62. The mixing dispersion device 70 may operate to disperse the wastewater 5 as an influent (through conduit 34 or via a batch process) in an upper portion of the mixing containment device 62 into contact with a sorptive agent. The mixing dispersion device 70 may be of any shape or undergo any process action to facilitate the forced flow contact of the sorptive agent into contact with the wastewater 5 from the influent port 42, such as by rotation, agitation, oscillation, vibration, or the like, or may undergo no movement at all. By way of example only, the mixing dispersion device 70 may be an inverted cone shape, a bowl shape, a two- or more headed tubular spout shape, or may be directly connected to the influent port 42 to facilitate further wastewater 5 flow.

Over a period of time, the sorptive agent encapsulated oil material rises to the top and the unencapsulated fluid (water and denser solids) comprise portion of the phase separation section. Depending on the flow rate and volume of material used, a portion of the sorptive agent may be pushed beyond the central tubular mixing containment section 62, and may rise to the top of the surface, as well as the processed encapsulated oil which will rise. The material that falls below the surface of the encapsulated oil may be re-introduced into the clarifier system 60 for additional treatment, via the plurality of decant valves 58 or through the outlet 56. Additionally, the unencapsulated fluid that falls may be transported from the containment device or clarifier system for additional processing. Additional processing, as would be understood by one skilled in the art, may mean any chemical or mechanical processing station or device (not shown). As is known, the chemical or mechanical processing may include any combination of dewatering device, filter, centrifuge, decanter, hydrocyclonic separator, filter press or the like. Further, chemical agents or additives may be used to treat the encapsulated product, the solids in the unencapsulated fluid, or any combination, depending on the intended product use.

Upon completion of processing a batch cycle, the encapsulated oil is typically in a gelatinous form. The gelatinous encapsulated oil, which floats to the top in the chamber, may be removed from the oil removal reclamation clarifier system 60 via a decant valve 58 or through the outlet 56. Further, as is known in the art, an operator may condition the product by adding a small amount of liquid oil to the gelatinous processed encapsulated oil (in or outside of the system 60), thereby changing the consistency to a liquid for use or additional processing. Optionally, the encapsulated oil may be kept in the gelatinous phase. The processes for transferring, conditioning, de-watering, etc. are well known to those persons skilled in the art.

In some higher volume processing situations, the encapsulated oil mixture may be fed into a tank (not shown) for further conditioning. The mixture in the tank may sit in the tank for a period of time or may be transferred to another station for further processing. The lower portion of the mixture in the tank, if further separation occurs, or if any non-encapsulated oil is transferred to the tank along with the encapsulated material, may optionally be sent back to the oil removal system 10.

It will be understood that the oil removal system 60 can be of varying size and shape, but may, as an example, hold approximately 500 gallons of fluid and 2 cubic feet of sorptive agent in one batch.

INDUSTRIAL APPLICABILITY

The preferred oil removal or oil recovery process is initiated with the encapsulation of the oil particles and droplets using the sorptive agent. The encapsulated oil particles and droplets typically remain buoyant for a period of time, during which time the encapsulated oil particles and droplets can be removed and collected from oil removal system 60 via the outlet 56 or other collection processes.

As indicated above, various materials can be added to the encapsulated oil material during the aforementioned steps to aid the processing of the material as well as to complete the recovery of the oil product. In addition, specific additional ingredients such as binders, plasticizers, stabilizers, pigments, flow control agents, etc. can be included to restore properties to the recycled oil product that may have been lost during the processing.

It will be appreciated that the foregoing description provides examples of an oil reclamation clarifier and containment system. However, it is contemplated that other implementations of the disclosure may differ in detail from the foregoing examples, as would occur to those skilled in the art. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values or dimensions herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An oil removal reclamation clarifier system in communication with a body of oil laden wastewater fluid and a conduit for transporting the fluid to the reclamation clarifier system, the reclamation clarifier system comprising:
    an oil removal mixing containment device comprising
        an influent port and
        a sorptive agent inlet,
            wherein the oil removal mixing containment device is configured to facilitate contact between the oil laden wastewater fluid provided through the influent port and a sorptive agent provided through the sorptive agent inlet, thereby allowing sorptive agent to bond with oil contained within the oil laden wastewater fluid to produce an encapsulated oil product, wherein the oil removal mixing containment device includes an upper and lower section shaped for gravitational flow;
    a phase separation section disposed about and in fluid communication with the oil removal mixing containment device configured to collect a downward fluid flow of the encapsulated oil product and unencapsulated fluid, wherein said lower section of the oil removal containment mixing device is partially contained within a lower section of the phase separation section;
    an outlet for removal of encapsulated oil product and unencapsulated fluid, and,
    at least one decant valve located along or near a portion of a sidewall of the phase separation section.

2. The reclamation clarifier system of claim 1, wherein the oil removal mixing containment device further comprises: a device for dispersing the oil laden wastewater fluid as an influent in the upper section of the oil removal mixing containment device into contact with the sorptive agent proximate to the upper end of the upper section of the oil removal mixing containment device.

3. The reclamation clarifier system of claim 1, wherein the at least one decant valve permits encapsulated oil product to exit the phase separation section.

4. The reclamation clarifier system of claim 1 further including a recirculation line, wherein the unencapsulated fluid is reintroduced from the at least one decant valve back into the oil removal mixing containment device.

5. The reclamation clarifier system of claim 1, wherein the unencapsulated fluid is directed from the at least one decant valve for additional processing.

6. The reclamation clarifier system of claim 1, wherein the unencapsulated fluid is directed from the outlet.

7. The reclamation clarifier system of claim 1, wherein the encapsulated oil product is directed out from the at least one decant valves for additional processing.

8. The reclamation clarifier system of claim 1, wherein encapsulated oil product is reintroduced to the oil removal clarifier system from the outlet.

9. The reclamation clarifier system of claim 1, wherein encapsulated oil product is reintroduced to the oil removal clarifier system from the at least one decant valve.

* * * * *